Dec. 7, 1965  A. A. SOUZA  3,221,951
MEASURING DISPENSER
Filed March 30, 1964
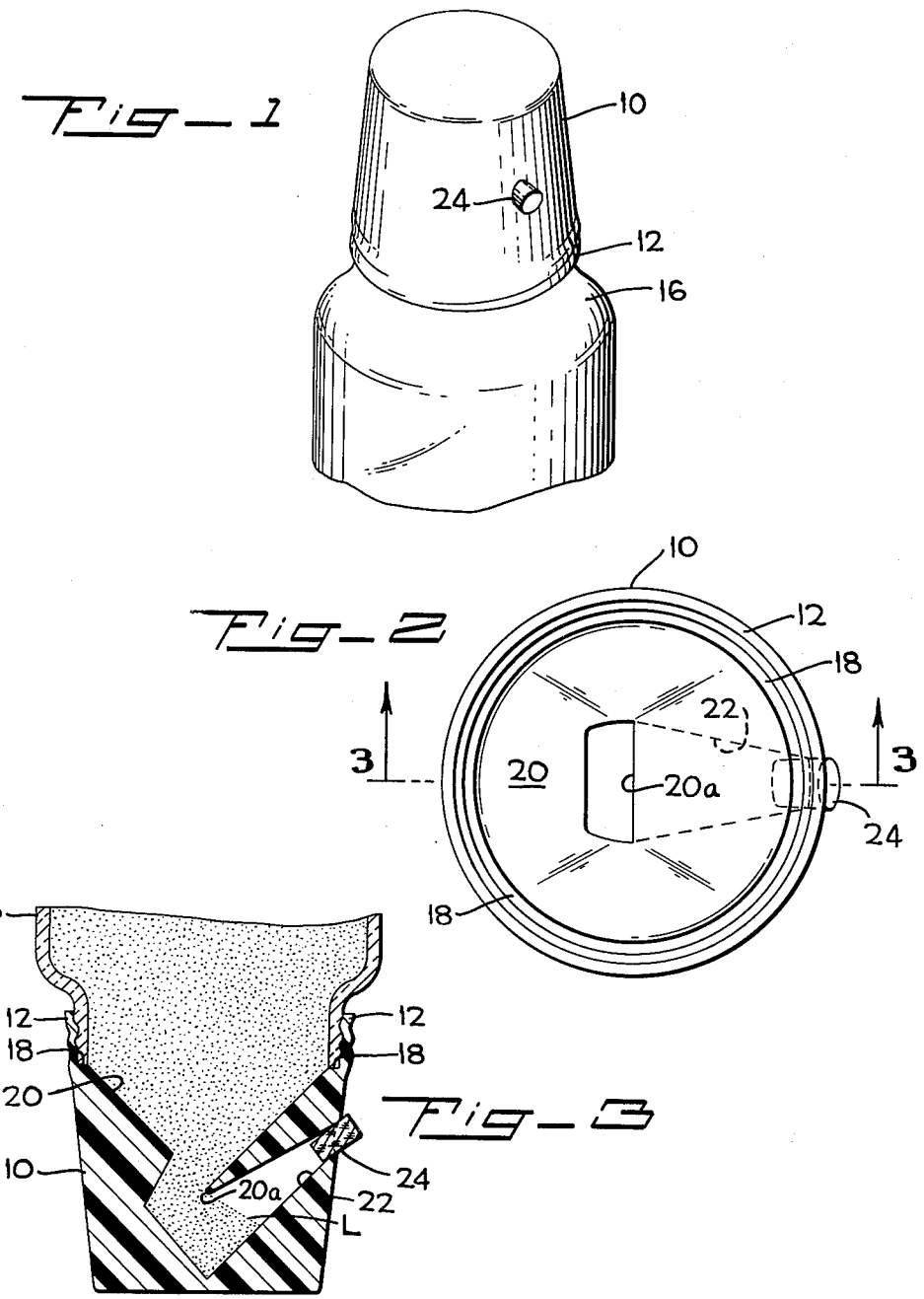
INVENTOR.
AUGUSTINE A. SOUZA
BY
Paul B. Dike
PATENT AGENT

United States Patent Office 3,221,951
Patented Dec. 7, 1965

3,221,951
MEASURING DISPENSER
Augustine A. Souza, 431 Casa Blanca Drive,
San Jose, Calif.
Filed Mar. 30, 1964, Ser. No. 355,828
5 Claims. (Cl. 222—456)

The present invention relates generally to dispensers, and more particularly, to a measuring dispenser for sugar, powdered coffee, or other similar fluent granular materials.

The necessity for the dispensing of a measured amount of sugar, powdered coffee and many other fluent granular materials is common and frequent. However, substantially all measuring dispensers currently in use have one or more moving parts which render the units relatively expensive and subject to not infrequent maintenance and repair.

It is, accordingly, a general object of the present invention to provide a measuring dispenser of extremely simple design and including no moving parts.

More particularly, it is a feature of the invention to provide a measuring dispenser that can constitute an integral, single unit that can be simply fabricated and also can be readily used to accurately dispense a desired amount of the granular material.

Additionally, it is a feature of the invention to provide a measuring dispenser wherein the inherent characteristics of the granular material are utilized to achieve the measuring function.

More particularly, it is a feature of the invention to provide a measuring dispenser which can take the form of a cap which can be readily applied to the top of a bottle or other container for the material to be dispensed.

In accordance with an additional, related aspect of the invention, the dispenser cap can be provided with a closure element to provide a hermetic seal.

These as well as other objects and features of the invention will become more apparent from a perusal of the following description of the structure illustrated in the accompanying drawing wherein:

FIG. 1 is an isometric view of a measuring dispenser embodying the present invention, and more particularly, in the form of a dispensing cap applied to a bottle, FIG. 2 is a plan view showing the entrance end of the measuring dispenser, and FIG. 3 is a central vertical sectional view taken along line 3—3 of FIG. 2 illustrating additional details of the structure of the measuring dispenser and indicating its operational characteristics.

As shown in the drawings, the measuring dispenser includes a unitary generally cylindrical body member 10 having a flange portion 12 at one end which is interiorly threaded so that the structure can be applied as a cap to the exterior threads on the neck of a conventional bottle 16. Preferably, shoulders 18 are formed adjacent the threaded flange 12 to make sealing contact with the bottle 16 when the measuring cap is fully screwed thereon, as clearly illustrated in FIG. 3.

The interior of the body member 10 is formed with a first conduit 20 which extends substantially axially therethrough in general alignment with the axis of the bottle 16. Preferably, the walls of the first conduit 20 taper inwardly from the described shoulder 18 so that when the bottle 16 and the applied cap are placed in an inverted position, as illustrated in FIG. 3, the conduit 20 takes the form of a funnel. Preferably, as shown, the walls of the funnel are inclined at an angle of 45° relative to the horizontal, as viewed in FIG. 3, and in any event are inclined at an angle greater than the angle of repose of the material to be dispensed. For example, the angle of repose of powdered coffee at normal ambient temperature and humidity is approximately 30° the angle of repose being that angle or slope which the surface of a pile of powdered coffee will naturally assume under simple gravitational conditions. Since the described funnel angle of 45° is considerably greater than the angle of repose of powdered coffee, powdered coffee will flow readily from the bottle 16 through the conduit 20 when the bottle and cap are inverted as shown in FIG. 3.

Additionally, it is preferred, as illustrated, that one wall portion of the conduit 20 extends downwardly below that of the diametrically opposite wall portion terminating at a point 20a below but substantially aligned with that opposite wall portion, as clearly illustrated in FIG. 3. Such configuration precludes bridging of the granular material across the exit of the conduit 20 and also controls the dispensing of the requisite measured amount of the powdered coffee or other granular material as will become more apparent hereinafter.

Immediately below the exit end of the first conduit or funnel 20 is an enlarged chamber forming the entrance end of a second conduit 22 which extends generally transversely to the axis of the body member 10 and to the axis of the bottle 16 to which it is attached, this conduit extending laterally to an exit opening in the exterior wall of the body member 10. Preferably, this second conduit 22 is also of funnel-like configuration tapering inwardly from its entrance end to its exit end at the side of the body member 10. The lower wall of this second conduit 22 also is preferably disposed at an angle of 45° so that the entrance end of this second conduit is below its exit end when the unit resides in its inverted disposition, as viewed in FIG. 3. Furthermore, the included angle between the conduits 20, 22 is acute so that the exit end of the second conduit 22 is above the exit end of the first conduit 20. The wall portion terminating in the lowermost point 20a of the first conduit 20 forms a dividing partition between the two conduits 20, 22.

Consequently, when the bottle 16 and applied cap are placed in the inverted position shown in FIG. 3, powdered coffee or other granular material will flow downwardly through the first conduit of funnel 20 and into the entrance end of the second conduit 22. However, because of the inherent flow characteristics of the material and the angular relationship of the first and second conduits 20, 22, the flow of material will stop in the illustrated position with the surface of the powdered coffee in the second conduit 22 lying at its normal angle of repose, as indicated at L.

If the entire structure is now rotated in a clockwise direction from that illustrated in FIG. 3 through an angle of 90°, substantially all of the granular material within the entrance end of the second conduit 22 will flow freely therefrom through the exit opening. In turn, that powdered coffee lying above the lower extremity 20a of the first conduit or funnel 20 will be diverted back into that funnel whose lower surface now resides at an angle of 45° to allow such free flow. Accordingly, only that volume of material lying below the lowermost end 20a of the first conduit of funnel 20 will be dispensed, the remainder of the material flowing back toward the bottle.

As will be seen, the dispensing operation is extremely simple, involving first inversion of the bottle 16 and its cap and thereafter a simple rotative movement of 90° to dispense the measured quantity of the material whereupon the bottle and cap can be returned to normal upright disposition.

For certain materials such as sugar or powdered coffee which are adversely affected by exposure to air, a small plug 24 can be inserted into the exit opening of the second conduit 22 or any alternate closure can be utilized.

The entire structure of the measuring cap can obviously be formed from a single integral unit which most simply can be fabricated from molded plastic, although other materials can be substituted therefor. Yet many further modifications and alterations can be made in the described structure without departing from the spirit of the present invention, and accordingly, the foregoing description of one embodiment is to be considered as purely exemplary and not in a limiting sense. The actual scope of the invention is to be indicated by reference to the appended claims.

What is claimed is:

1. A measuring dispenser for granular material which comprises a body member having a first conduit arranged to receive material when in a substantially vertical position and to conduct material therethrough from its upper entrance end to its lower exit end, a second conduit in said body member and extending transversely relative to said first conduit, the entrance end of said second conduit communicating with the exit end of said first conduit and arranged to conduct material therethrough under gravitational force when said body member is rotated approximately 90° about a horizontal axis from its entrance end to its exit end, said body member having a smooth exterior configuration with said first and second conduits formed entirely therewithin wherefore projecting elements are eliminated.

2. A measuring dispenser according to claim 1 wherein said body member includes a cylindrical interiorly-threaded flange axially aligned with said fisrt conduit enabling screwed connection to a threaded container.

3. A measuring dispenser for granular material which comprises a body member having a first conduit arranged to receive material when in a substantially vertical position and to conduct material therethrough from its upper entrance end to its lower exit end, a second conduit in said body member and extending transversely relative to said first conduit, the entrance end of said second conduit communicating with the exit end of said first conduit and arranged to conduct material therethrough under gravitational force when said body member is rotated approximately 90° about a horizontal axis from its entrance end to its exit end, a wall portion of said first conduit where it joins said second conduit on the side of said first conduit nearest the exit end of said second conduit lying below its opposite wall portion when said first conduit lies in a vertical disposition.

4. A measuring dispenser for granular material which comprises a body member having a first conduit arranged to receive material when in a substantially vertical position and to conduct material therethrough from its upper entrance end to its lower exit end, a second conduit in said body member and extending transversely relative to said first conduit, the entrance end of said second conduit communicating with the exit end of said first conduit and arranged to conduct material therethrough under gravitational force when said body member is rotated approximately 90° about a horizontal axis from its entrance end to its exit end, both of said conduits being funnel-shaped and tapering inwardly from their entrance to their exit ends, the angle of said funnel-shaped conduit walls relative to a plane perpendicular to the flow of material therethrough being greater than the angle of repose of such material.

5. A measuring dispenser according to claim 4 wherein the wall angle is 45°.

References Cited by the Examiner

UNITED STATES PATENTS

| | | | |
|---|---|---|---|
| 856,543 | 6/1907 | Nolan | 222—456 |
| 2,385,195 | 9/1945 | Clower | 222—456 |
| 3,128,919 | 4/1964 | Baxter | 222—456 X |

LOUIS J. DEMBO, *Primary Examiner.*

RAPHAEL M. LUPO, *Examiner.*